3,829,530
OILLESS ALKYDS

Thomas Michael Powanda, Middlesex, N.J., assignor to Celanese Corporation, New York, N.Y.
No Drawing. Continuation of abandoned application Ser. No. 56,232, July 15, 1970. This application Apr. 14, 1972, Ser. No. 244,308
Int. Cl. C08g 37/34, 17/04
U.S. Cl. 260—850           4 Claims

ABSTRACT OF THE DISCLOSURE

An oilless alkyd capable of providing superior coatings containing an interpolymer of a polyol having 3 to 4 hydroxyl functional groups, an aliphatic diol having 5 to 7 carbon atoms and a phthalic anhydride component.

---

This is continuation of application Ser. No. 56,232, filed July 15, 1970 now abandoned.

This invention relates to oilless alkyds wherein the coatings are characterized by improved flexibility, chemical resistance adhesion, and significantly higher surface hardness over the generally acceptable conventional alkyds.

The generally acceptable conventional alkyds are essentially composed of polyols, aromatic dibasic acids and an aliphatic monobasic long chain unsaturated fatty acid and are utilized to prepare film coatings for such uses as baking enamels for equipment machinery, appliances, strip and coil coatings and the like. The known disadvantages of the conventional alkyds are poor color retention, aged hardness or brittleness of film coatings occurs over a period of time and it is generally believed that these disadvantages are caused by the air oxidation of the unsaturated bonds of the long chain fatty acid of the conventional alkyds which are required to provide a coating having the desired flexibility. Furthermore, conventional alkyds containing more than 40 percent aromatic dibasic acids, especially phthalic anhydride do not provide coatings having acceptable properties such as flexibility, chemical resistance, hardness and the like. In the formulation of polyesters based upon phthalic anhydride as the acid component, it is known that resins containing 20 percent phthalic anhydride and moieties of polyfunctional alcohols such as glycerine, pentaerythritol, or trimethylolpropane, whether these are used singly or in combination, are soft and lacking in mar resistance. On the other hand, resins of this type containing about 40 percent phthalic anhydride are highly brittle and lack adhesion.

Oilless alkyds, i.e., alkyds without the long chain fatty acids, have been discovered which provide superior coatings in regard to flexibility, chemical resistance, adhesion among others utilizing phthalic anhydride contents in excess of 40 weight percent These oilless alkyds comprise an interpolymer of a polyol having 3 to 4 hydroxyl functional groups, an aliphatic diol having 5 to 7 carbon atoms and a phthalic anhydride component. The interpolymer, as produced, is substantially free of gelation.

The polyols which can be utilized can include glycerine, pentaerythritol, trimethylolpropane, among others. The aliphatic diol which can be utilized include pentanediol, hexanediol and heptanediol and particularly preferred is 1,6-hexane-diol. The phthalic anhydride component can include phthalic acid, isophthalic acid as well as phthalic anhydride.

The amounts of polyols in the interpolymer can range from about 2.5 to 25 weight percent preferably from about 5 to 20 weight percent based on the total interpolymer. The aliphatic diol can range in amounts from about 25 to 45 weight percent preferably from about 30 to 40 weight percent based on the total interpolymer. The phthalic anhydride component can range from about 45 to 65 weight percent, preferably from about 50 to 60 weight percent based on the total interpolymer. It is recognized of course that the total amount of components will not exceed 100 weight percent. Curable compositions can be produced utilizing the oilless alkyds of this invention in combination with amino resins to produce outstanding films. Typical of amino resins are those falling in the class of ureaformaldehyde and melamine formaldehyde condensation products which are well known in the art. Particularly preferred amino resins are the methoxy alkyl melamines containing from 3 to 6 methoxy alkyl groups and the alkyl radicals contain from 1 to 6 carbon atoms. The amounts of the amino resins in these curable compositions can range from about 5 weight percent to about 50 weight percent with the remainder being the interpolymer as heretofore described.

The interpolymers of this invention are particularly useful in the preparation of alkyds, urethans, epoxies laminating resins, waxes, flame retardants and the like.

The following examples will serve to illustrate the invention hereinabove described without limiting the same.

EXAMPLE 1

In a reaction vessel is placed 272 grams pentaerythritol, 1062 grams 1,6-hexanediol and 1480 grams phthalic anhydride. Nitrogen is passed over the reactants to replace available air and heat is applied. The esterification reaction is run at a temperature not exceeding 234° C. over a 7-hour period. During this period 180 grams of water is removed. After the reaction is completed, the reaction product is cooled and 550 grams of a butanol/xylol solvent (50/50) is added to provide an oilless alkyd substantially free of gelation having the following properties:

Solids _____ 60.1%.
Viscosity _____ 720 centipoises.
Acid number _____ 3.2.
Color _____ −1 (Gardner).

EXAMPLE 2

Utilizing the same procedure and the same amounts of reactants as Example 1 except reducing the phthalic anhydride content to 740 grams and adding 730 grams adipic acid, the reaction is run at a temperature not exceeding 240° C. for 5½ hours. The reaction product is cooled and 550 grams of butanol/xylol solvent (50/50) is added. This product has the following properties:

Solids _____ 60.2 percent.
Viscosity _____ 980 centipoises.
Acid No. _____ 2.7.
Color _____ −1 (Gardner).

EXAMPLE 3

Utilizing the procedure of Example 1, 1496 grams pentaerythritol, 297 grams paraformaldehyde (91 percent) and 1480 grams phthalic anhydride are reacted at temperatures not exceeding 192° C. over a period of 5 hours while 342 grams of water was removed. At the 5-hour period, the reaction is stopped and the product cooled. To the product is added 550 grams of butanol/xylol solvent (50/50). This product has the following properties:

Solids _____ 59.9 percent.
Viscosity _____ 1650 centipoises.
Acid No. _____ 43.
Color _____ <1 (Gardner).

EXAMPLE 4

Utilizing the same procedure and materials as Example 1 except substituting 810 grams of 1,3-butylene glycol for 1,6-hexandiol, the reaction occurs over a temperature range of 173° C. to 214° C. for a 5-hour period. The reaction is stopped cooled and 550 grams of butanol/xylol solvent (50/50) is added. This product has the following properties:

| | |
|---|---|
| Solids | 60.2 percent. |
| Viscosity | 1640 centipoises. |
| Acid No. | 23.5. |
| Color | 1 (Gardner). |

Each of the products of Examples 1 through 4 are blended with a melamine resin containing predominately hexamethoxymethyl melamine on a solids basis of 80/20 alkyd to melamine. The blends are then cutback to 50 percent solids with xylol/butanol/butyl cellosovle solvent and 1 percent of a catalyst mixture of 20 weight percent of paratoluene sulfonic acid and 80 weight percent methanol is added on the solids basis. Mixtures are cast on a bonderized steel panel at "0.003 inch thickness." The panels are air dried for 15 minutes and then cured at 300° F. for 30 minutes. The following results are obtained in Table I below:

TABLE I

| Example: | Pencil hardness | Conical mandrel, inch/failure | Impact flexibility, inch-pounds/failure |
|---|---|---|---|
| 1 | 9 | No failure | 60 |
| 2 | 5 | ⅛ inch | 40 |
| 3 | 9 | Complete failure | 0 |
| 4 | 7 | 5¾ inches | 0 |

The tests which are utilized above are briefly described as follows:

Pencil Hardness—a series of pencils are utilized each having lead of increasing hardness. The cured coatings are scratched with the pencils. When a scratch is made that cannot be removed by slight buffing, the coating is said to be as hard as the previously used lower numbered pencil.

Conical Mandrel—a cured coated panel is bent around a cone shaped mandrel (having an appearance such as an ice cream cone). The bend ranges from ⅛ inch to 2 inch diameter. The length of the failure of the coating is measured.

Impact Resistance—a one pound weight is enclosed in a hollow tube which is graduated in inches. A cured coated panel is placed under the hollow tube. The weight is lifted the required number of inches and dropped on the panel until the point of failure occurs. The point of failure (cracks in coating) is indicated as number of inch the weight was dropped and is recorded in inch pounds.

From the comparative data of Table I, the properties of films of the oilless alkyds in combination with melamine resins of this invention are superior to those films made from resins containing adipic acid, or paraformaldehyde in place of 1,6-hexanediol or 1,3-butylene glycol instead of 1,6-hexanediol. These differences are significant for producing highly desirable films.

It is to be understood that the foregoing description is merely illustrative of preferred embodiments of the invention of which many variations may be made by those skilled in the art within the scope of the following claims without departing from the spirit thereof.

I claim:

1. A curable composition composed of an oilless alkyd consisting essentially of an interpolymer derived from:
   (a) about 2.5 percent to about 25 percent by weight based on the total weight of the interpolymer of pentaerythritol;
   (b) about 25 percent to about 45 percent by weight based on the total weight of the interpolymer of 1,6-hexanediol; and
   (c) a phthalic anhydride component in an amount between tbout 45 percent and about 65 percent by weight based on the total weight of the interpolymer, and an amino resin.

2. The curable composition of claim 1 wherein the pentaerythritol is present in amounts ranging from about 5 to about 20 weight percent, the 1,6-hexanediol is present in amounts ranging from about 30 to about 40 weight percent and the phthalic anhydride is present in amounts ranging from about 50 to about 60 weight percent based on the total weight of the interpolymer and the total percentages not exceeding 100 weight percent.

3. The composition of claim 2 wherein the amino resin is a methoxyalkyl melamine containing 3 to 6 methoxyalkyl groups and the alkyl radical contains 1 to 6 carbon atoms.

4. The composition of claim 3 wherein the methoxyalkyl melamine is hexamethoxymethyl melamine.

References Cited
UNITED STATES PATENTS

| | | | |
|---|---|---|---|
| 3,161,618 | 12/1964 | Kreps | 260—75 |
| 3,027,279 | 3/1962 | Kurka et al. | 260—75 |
| 3,461,186 | 8/1969 | Galiano et al. | 260—850 |
| 3,686,360 | 8/1972 | Cunningham | 260—850 |
| 3,108,089 | 10/1963 | Ferstandig | 260—850 |
| 3,428,479 | 2/1969 | Dobransky | 260—850 |

JOHN C. BLEUTGE, Primary Examiner

U.S. Cl. X.R.

117—132 BF; 260—33.4 R, 75 R